United States Patent Office 3,833,709
Patented Sept. 3, 1974

---

3,833,709
RECOVERY OF MAGNESIUM CHLORIDE HEXAHYDRATE FROM CARNALLITE ORE
Pierre J. Chassagne, Palo Alto, Calif., assignor to Bechtel International Corporation
No Drawing. Continuation-in-part of abandoned application Ser. No. 230,986, Mar. 1, 1972. This application Apr. 2, 1973, Ser. No. 347,222
Int. Cl. B01d *11/02;* C01d *3/18;* C01f *5/30*
U.S. Cl. 423—157                             2 Claims

ABSTRACT OF THE DISCLOSURE

The various standard texts on mineralogy give the composition of carnallite as $MgCl_2 \cdot KCl \cdot 6H_2O$. In industrial usage, the term "carnallite ores" is used as referring to the foregoing salt mixture together with various other salts such as sodium chloride and other insoluble materials either as a broken ore or in the form of a natural deposit. I have found that by treating carnallite ores with any one of the lower saturated monohydric aliphatic alcohols having from 1 to 4 carbon atoms such as methanol, ethanol, propanol, isopropyl alcohol, n-butyl alcohol, secondary-butyl alcohol, iso-butyl alcohol and tert-butyl alcohol, the magnesium choride hexahydrate goes into soution leaving the potassium chloride and other salts and insoluble materials as an insoluble residue.

---

This is a continuation-in-part of my prior application Ser. No. 230,986, filed Mar. 1, 1972, now abandoned.

BACKGROUND OF THE INVENTION

All of the known methods for separating potassium chloride from magnesium chloride hexahydrate and other salts and insoluble materials in carnallite ores use dissolution of those ores in water or in aqueous solutions of salts.

SUMMARY OF THE INVENTION

It is in general the broad object of the present invention to provide a simple and improved process for separating magnesium chloride hexahydrate from potassium chloride and other insoluble salts and materials as these occur in carnallite ores.

DESCRIPTION OF THE PREFERRED EMBODIMENT

In accordance with this invention, carnallite ores are treated with one of the foregoing alcohols which preferentially dissolves the magnesium chloride hexahydrate. The alcohol containing the magnesium chloride hexahydrate is then separated from the solid insoluble residue of potassium chloride and other insoluble salts and materials and then the magnesium chloride hexahydrate is recovered from the alcohol.

As a specific example of the practice of the invention, 25 parts (by weight) of an American carnallite ore, ground to 325 mesh, was added to 50 parts (by weight) of methanol at 30° C. under agitation. After an hour, the slurry was filtered and the filter cake was dried and weighed. Upon analysis it was found that the remaining solids contained 98% of the potassium chloride present in the carnallite ore while the methanol contained 98% of the magnesium chloride hexahydrate formerly in the carnallite ore. The methanol containing magnesium chloride hexahydrate in solution was evaporated and recovered to leave the magnesium chloride hexahydrate as a solid residue, the methanol being available for reuse in the process.

In another process exemplifying the present invention, the methanol containing magnesium chloride hexahydrate was separated from the solid residue of potassium chloride and other insoluble salts and materials. The solution was then evaporated to a point whereat the methanol concentration was reduced to 10% by weight of the total mass which amounted to a total of 150 grams. 10 ccs. of water were then added to the mass and the heating was continued to boil off the methanol. When the boil-off was complete, the magnesium chloride hexahydrate remained as a solid.

In another process exemplifying the present invention, 125 grams of an African carnallite ore were ground to pass a 100 mesh screen. The ground ore was agitated with 200 cc. of methanol for ten minutes at room temperature after which it was filtered. The filter cake was air dried and the weight of the cake was 40 grams. It contained 98% of the solid potassium chloride present in the original sample of carnallite ore and chemical analysis showed only a trace of magnesium. The methanol solution recovered by filtration was boiled under 10 mm. mercury vacuum to evaporate the methanol. The solid residue was 83 grams containing more than 99% of the original magnesium chloride hexahydrate. It contained 0.12% of potassium chloride.

The practice of the invention is not limited to the carnallite ores being in finely divided form. Thus, I have been able to remove the magnesium chloride hexahydrate by the use of methanol from pieces of an African carnallite ore which were 1" to 2" in size. The dissolution of the solid occurred normally, the magnesium chloride hexahydrate going into solution in the methanol leaving the solid insoluble residue of potassium chloride and other insoluble salts and materials.

As another example, I placed a piece of an African carnallite ore measuring approximately 2" by 6" by 8" in a beaker containing 2 liters of methanol at 30° C. Dissolution occurred rapidly and after twelve hours half of the carnallite ore block had dissolved. The remaining carnallite ore block was permitted to remain in contact with the methanol until the shape of the block was lost, resulting in methanol containing magnesium chloride hexahydrate in solution and a white residue of potassium chloride and sodium chloride and other insoluble materials in the bottom of the beaker. The rate of dissolution can be increased by air or other agitation and the resulting slurry can be pumped with the potassium chloride and other insoluble salts and materials in suspension. These insolubles can be separated and treated to recover various of the insolubles present.

While in each of the above examples I have mentioned the use of methanol, like separations can be secured using each of the aforementioned lower saturated monohydric aliphatic alcohols.

While I have described the invention as it applies specifically to carnallite ores, it is also useful in the separation of magnesium chloride hexahydrate from another salt or a mixture of insoluble materials with one of the named alcohols which are preferential solvents for the magnesium chloride hexahydrate, the other salt or materials being insoluble in the alcohol.

I claim:

1. A process for separating and recovering magnesium chloride hexahydrate from insoluble salts and materials as these occur in carnallite ore deposits, comprising contacting such carnallite ore with only a lower saturated monohydric aliphatic alcohol having from 1 to 4 carbon atoms to dissolve the magnesium chloride hexahydrate preferentially, causing the carnallite to disintegrate to provide a liquid phase containing magnesium chloride hexahydrate and alcohol in solution and a solid phase containing alcohol insoluble residue in a pumpable slurry, separating the solid phase, removing alcohol from the liquid phase resulting in a pure magnesium chloride solid phase containing magnesium chloride hexahydrate in the order of 98% and recycling the alcohol to the contacting step to dissolve further amounts of magnesium chloride hexahydrate.

2. A process as in claim 1 wherein the liquid fraction is heated to remove a major portion of the alcohol, then adding water to the mixture while continuing the heating to boil off the alcohol from the magnesium chloride hexahydrate.

References Cited
UNITED STATES PATENTS

| | | | |
|---|---|---|---|
| 3,357,800 | 12/1967 | Tasha | 23—297 |
| 3,642,454 | 2/1972 | Nylander | 23—297 |
| 3,442,553 | 5/1969 | Kutz | 299—4 |

NORMAN YUDKOFF, Primary Examiner

S. J. EMERY, Assistant Examiner

U.S. Cl. X.R.

23—299, 304; 299—4, 5; 423—158, 181, 184